United States Patent [19]

Allison

[11] Patent Number: 5,703,578
[45] Date of Patent: Dec. 30, 1997

[54] FOLDING KEYBOARD

[75] Inventor: Jeffery Daniel Allison, Seattle, Wash.

[73] Assignee: International Business Machines Corporation, Armonk, N.Y.

[21] Appl. No.: 785,725

[22] Filed: Jan. 16, 1997

[51] Int. Cl.$^6$ .................................................. H03K 17/94
[52] U.S. Cl. ........................... 341/22; 361/680; 345/168; 400/492; 364/708.1
[58] Field of Search .......................... 341/22; 361/680; 345/168; 400/492, 682, 489; 364/708.1

[56] References Cited

U.S. PATENT DOCUMENTS

| | | | |
|---|---|---|---|
| 3,940,758 | 2/1976 | Margolin | 341/22 |
| 4,825,395 | 4/1989 | Kinser, Jr. | 364/708.1 |
| 5,198,991 | 3/1993 | Pollitt | 364/708 |
| 5,267,127 | 11/1993 | Pollitt | 361/680 |
| 5,278,779 | 1/1994 | Conway | 364/708.1 |
| 5,457,453 | 10/1995 | Chiu et al. | 341/22 |
| 5,519,569 | 5/1996 | Sellers | 361/680 |
| 5,519,570 | 5/1996 | Chung | 361/680 |
| 5,574,481 | 11/1996 | Lee | 341/22 |
| 5,575,576 | 11/1996 | Roysden | 341/22 |

FOREIGN PATENT DOCUMENTS 9103012  3/1991  WIPO.

*Primary Examiner*—Jeffery Hofsass
*Assistant Examiner*—Albert K. Wong
*Attorney, Agent, or Firm*—John H. Holcombe; James C. Pintner

[57] ABSTRACT

A folding keyboard is described having keyboard sections, each bearing a subset of keys of the keyboard, and a slider mounted to one of the keyboard sections bearing a row of keys of the keyboard section, the slider movable between a first position withdrawn into the keyboard section behind a pivot axis so as to facilitate folding of the keyboard into a closed position, and a second position, corresponding with an open position of the keyboard, extended beyond the pivot axis to nest with a corresponding notch in the other keyboard section, so that the subset of keys of the slider are in a configuration for use when in the nested position. A key of each of the keyboard sections positioned at the abutting edges thereof are narrowed, from the standard width of other of said keys, along the edge thereof adjoining the abutting edges, so that the abutting edges are straight edges when the slider is in the withdrawn position, allowing a straight edge at the folding side of the keyboard.

21 Claims, 3 Drawing Sheets

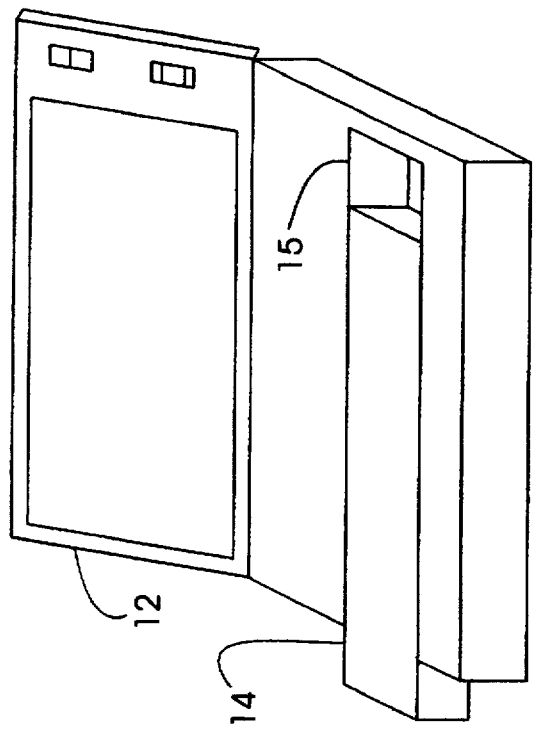
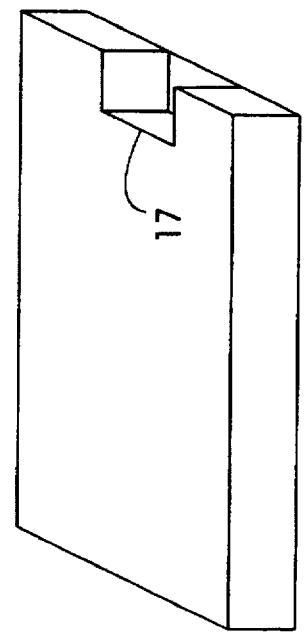
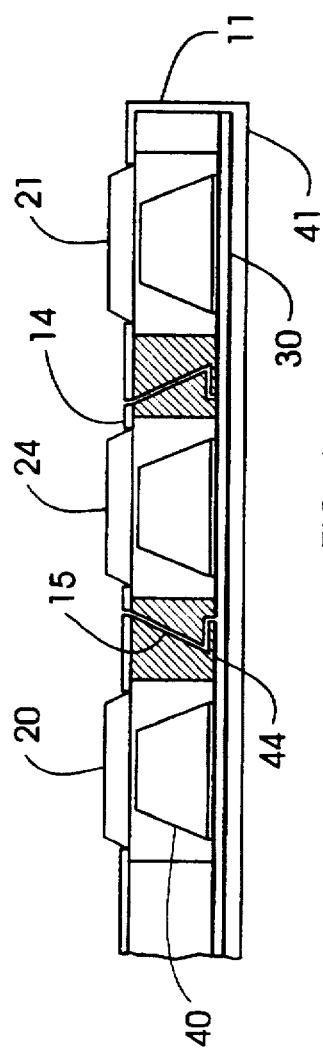

FOLDING KEYBOARD

TECHNICAL FIELD

The invention relates to a folding keyboard, and more particularly to a keyboard which permits a standard key layout and which folds into a more compact shape.

BACKGROUND OF THE INVENTION

Keyboards are essential input devices for many applications, including for computers used by individuals. Such individual or "personal" computers are often designed to be transportable and have been occupying less cubic volume over time. A limitation on the reduction in the size of portable personal computers has been the desire of users for a keyboard at least approximating the conventional keyboards known and used with desktop personal computers. Such conventional keyboards typically have an elongated rectangular form with alphanumeric keys arrayed in rows and staggered columns in the standard "QWERTY" layout of typewriters. Usually, such keyboards also have a number of special function keys arrayed around the standard keys.

As efforts have been made toward reducing the size of portable personal computers, some designers have chosen to reduce the size of the keys and thus the keyboards, while others have chosen various ways to fold the keyboards into a more compact arrangement for transportation. Such folded keyboards are best folded along an axis perpendicular to the length of the elongated rectangular form. The problem is that the keys comprise staggered rows and thus, when folded, leave an irregular edge along the fold. An example of such a folding keyboard is the Chiu et al., U.S. Pat. No. 5,457, 453. The patent describes special end covers which extend beyond the folded end of the keyboard to present a straighter edge. Such covers require greater complexity and, more importantly, prevent the keyboard and associated computer from being reduced in size to the degree desired.

SUMMARY OF THE INVENTION

The folding keyboard of the invention has, when folded along the "column" axis, a relatively straight edge along the fold. The keyboard comprises keyboard sections, each bearing a subset of keys of the keyboard, and a slider mounted to one of the keyboard sections bearing a row of keys of the keyboard section. The slider is movable between a first position withdrawn into the keyboard section behind a pivot axis so as to facilitate folding of the keyboard into a closed position, and a second position, corresponding with an open position of the keyboard, extended beyond the pivot axis to nest with a corresponding notch in the other keyboard section, so that the subset of keys of the slider are in a configuration for use. A key of each of the keyboard sections that is positioned at the abutting edge thereof is narrowed from the standard width of other keys, along the edge of the key that adjoins the abutting edge, so that the abutting edges are straight edges when the slider is in the withdrawn position, allowing a straight edge at the folding side of the keyboard.

BRIEF DESCRIPTION OF THE DRAWINGS

FIG. 1 is a diagrammatic view of the keyboard of the present invention as used for computer input;

FIG. 2 is a cross-section view of the keyboard of FIG. 1;

DETAILED DESCRIPTION OF THE INVENTION

Incorporation by Reference

Figure 3:
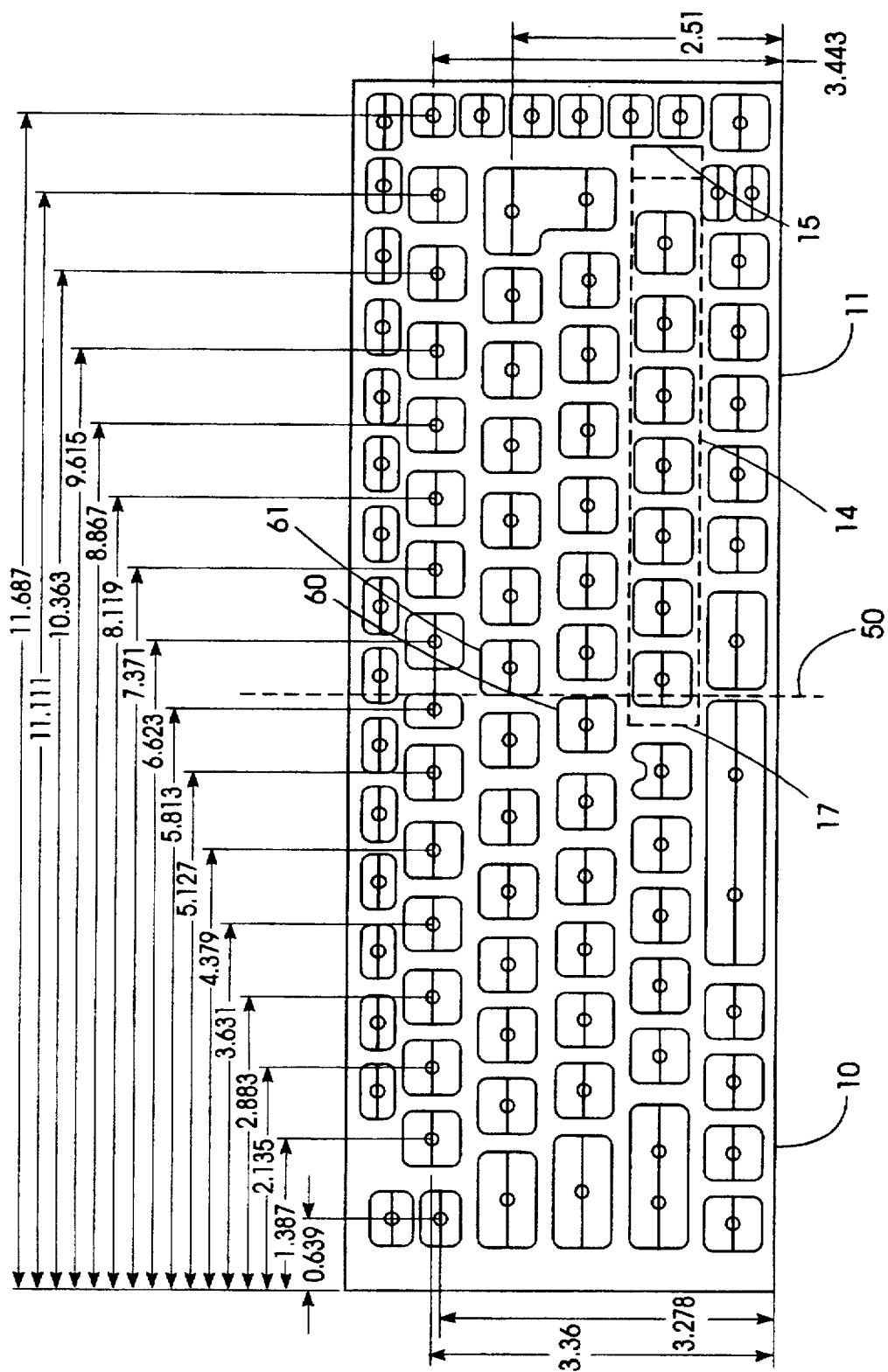
FIG. 3 is an example of a specific layout of a keyboard made in accordance with the present invention.

Keyboards are essential input devices for many applications, including for personal computers. As described above, such personal computers are often designed to be transportable and have been occupying less cubic volume over time. An example of such a portable personal computer is described in coassigned U.S. Pat. No. 5,198,991, incorporated by reference herein for the purpose of describing the computer per se and the connections between the computer and a folding keyboard, and such description will not be repeated here.

Preferred Embodiments

Referring first to FIG. 1, the folding keyboard of the present invention is illustrated in a diagrammatic view as used for computer input. The keyboard comprises at least two keyboard sections 10 and 11, each bearing a subset of keys of the keyboard. The keyboard forms the input device for a user to a portable personal computer. A display housing 12 for the computer is shown as connected to keyboard section 11. The remainder of the computer elements may be contained in or associated with housing 12, or contained in or associated with the keyboard sections 10 and/or 11. The computer may be of any suitable type, an example thereof comprising that of the '991 patent.

The keyboard sections 10 and 11 are shown separated in FIG. 1 for the purpose of illustration of the present invention. The housing 12 is shown attached to keyboard section 11, but may be attached to either section and may extend beyond the attached section.

A slider 14 is mounted to keyboard section 11 bearing a row of keys of the keyboard section. The slider is movable between a first position withdrawn into slot 15 in the keyboard section so as to facilitate folding of the keyboard into a closed position, and a second position, corresponding with an open position of the keyboard, extended beyond the pivot axis to nest with a corresponding notch 17 in the other keyboard section, so that the subset of keys of the slider are in a configuration for use when in the nested position, as will be shown. When the slider is in the extended position nested in notch 17, it serves to lock the keyboard in the open position and to prevent accidental folding of the keyboard. A latch may optionally be provided, such as a leaf spring positioned along a side of slot 15 and associated notches in the corresponding side of slider 14 to latch the slider in the extended and in the withdrawn positions.

A cross-section view of the keyboard section 11 and slider 14 of FIG. 1, taken in the column direction, is shown in FIG. 2. Slider 14 is shown positioned in slot 15 of the keyboard section. Keys 20 and 21 are located in rows adjacent the slider, and key 24 is one of the keys in the row of the slider.

The keyboard section also includes a set of actuator sheets 30. The sheets are the same as for a typical keyboard used as an input device for a portable personal computer and comprise three Mylar sheets, two of which have silkscreen electrical leads and contact pads thereon, and the third is a separator sheet which has holes therein at the location of the contact pads of the other two sheets. The electrical leads and contact pads are on the facing sides of the two sheets, and the pads and holes are aligned with the keys of the keyboard such that when the aligned key is pressed, the contact pad of the top sheet is forced through the hole of the separator sheet and into contact with the corresponding pad of the bottom sheet. The electrical connection between the contact pads provides the communication to the computer that the key is being pressed. The Mylar sheets are held in position by tabs in the keyboard sections, as in the typical keyboard, to maintain alignment between the keys and the sheets.

The keyboard of FIG. 2 shows one of two alternative arrangements of the keys contemplated by the invention. The keys 20, 21 and 24 are shown flexibly mounted on section 11 and on slider 14 spaced from actuator elements 40, 41 and 44, respectively. The actuator elements may comprise "domes" as typically used in keyboards for portable personal computers. The domes are rubber "Belleville springs" which provide a tactile "feel" to the key as it is depressed and which provide a definite contact pressure to the Mylar sheets at the bottom lateral center of the dome. As shown, the actuator elements 40, 41 and 44 are affixed to the back of the top Mylar sheet and are held stationary. Thus, as slider 14 is moved, the key 24 moves over the top of the stationary actuator element 44.

Alternatively, the actuator elements may be fixed to the keys and depressed therewith into contact with the Mylar sheets 30. In this alternative, the actuator element 44 is carried with the key 24 and slider 14 across the Mylar sheets as the slider is moved. The actuator elements may also comprise spacers attached to the keys and domes attached to the spacer or to the keyboard and slider and not the Mylar sheets.

An example of a precise layout of the keyboard of FIGS. 1 and 2 is shown in FIG. 3. The keyboard is shown in the open position with keyboard sections 10 and 11 abutting each other, and having a standard key arrangement. In the layout, slider 14 is shown in slot 15 in an extended position nested into notch 17. The precise dimensions and layout of the keyboard are exemplary only and are not intended to limit the scope of the invention in any way.

Pivot axis 50 is the axis about which the keyboard sections 10 and 11 rotate with respect to one another. Slider 14 is withdrawn fully into slot 15 and behind the pivot axis to allow the keyboard to be folded. The slider, when withdrawn, presents a relatively straight edge at the edge of the keyboard section 11 at pivot axis 50. Similarly, when the slider is withdrawn from the slot 17, the keyboard section 10 presents a relatively straight edge at pivot axis 50.

Figure 4:
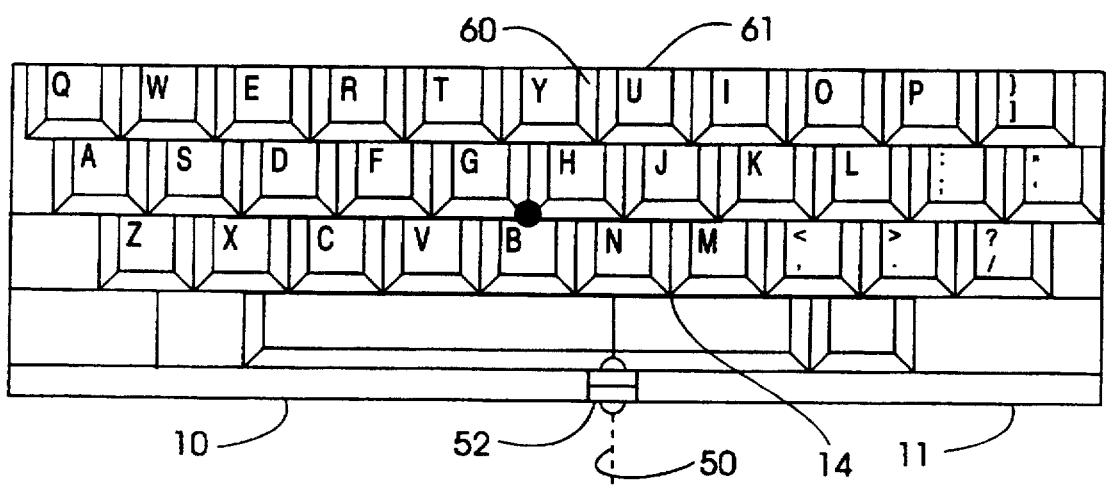
FIG. 4 is a plan view of a portion of the keyboard of FIG. 1 showing the slider in the withdrawn position.
Figure 5:
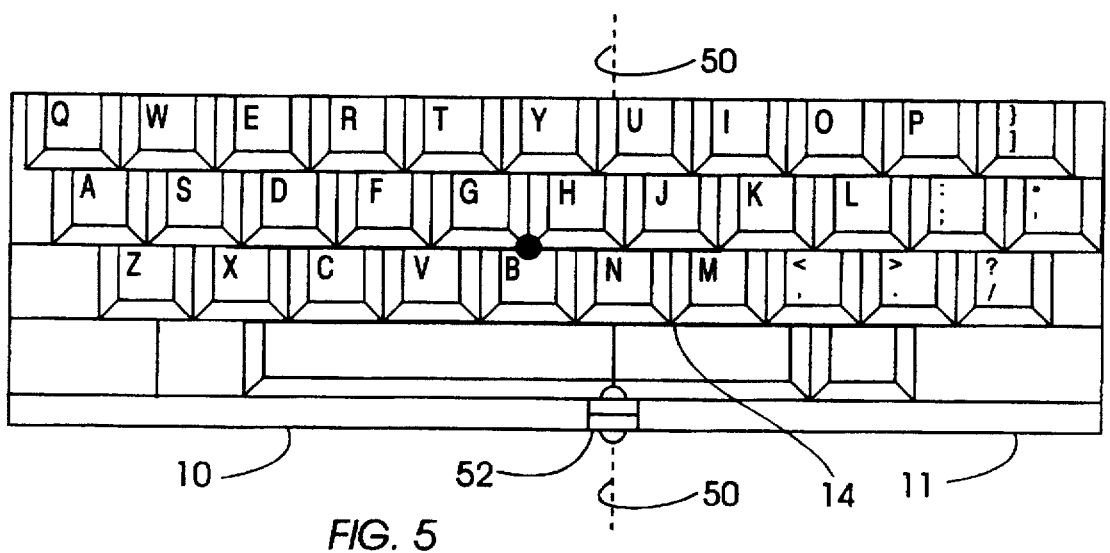
FIG. 5 is a plan view of a portion of the keyboard of FIG. 1 showing the slider in the extended position.

The edges of sections 10 and 11 are made straighter in accordance with the present invention by narrowing keys 60 and 61 at the sides toward the pivot axis 50, as shown in more detail in FIGS. 4 and 5. FIGS. 4 and 5 comprise plan views of a portion of the keyboard of FIGS. 1 and 2 with the slider 14, which comprises the "N" row, in the withdrawn position in FIG. 4 and in the extended position in FIG. 5. Hinge 52 is one of two which are on either side of the keyboard on the pivot axis 50 about which the keyboard sections are pivoted with respect to each other for folding.

As shown, the keys are shaped, having a concave central portion as is conventional for matching the shape of human finger tips. The edges of the keys are convex and tapered, as is also conventional. At the abutting edges of the keyboard sections, the "H" key 60 is narrowed at its right edge, and the "U" key 61 is narrowed at its left edge. Thus, when slider 14 is in the withdrawn position, both the left edge of keyboard section 11 and the right edge of keyboard section 10 are straight. When the keyboard is in the folded position, the folding edge thereof, which is defined by pivot axis 50, is also straight.

Figure 6:
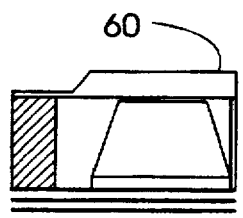
FIG. 6 is a cross section view of the keyboard of FIGS. 4 and 5 showing one narrowed key.
Figure 7:
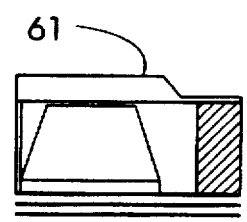
FIG. 7 is a cross section view of the keyboard of FIGS. 4 and 5 showing another narrowed key.

FIG. 6 comprises a cross section view of key 60 of FIGS. 4 and 5, taken in the row direction. Key 60 is narrowed at the edge towards the pivot axis 50 by the removal of only the tapered edge of the key. Thus, the full face of the key is available for actuation by the user. Similarly, FIG. 7 comprises a cross section view of key 61 of FIGS. 4 and 5, which key is narrowed at the edge towards the pivot axis 50. Again, only the tapered edge of the key is removed and the full face of the key is available for actuation by the user.

The keyboard of the present invention therefore retains the full standard "QWERTY" keyboard for all keys when in the open position and with the slider 14 in the extended position nested in the notch 17 in keyboard section 10, including the "H" and "U" keys. The keyboard, with the slider 14 in the withdrawn position into the slot 15 in keyboard section 11, presents straight edges at the pivot axis 50, facilitating the folding of the keyboard and providing a straight folded edge of the keyboard at the pivot axis 50 when so folded.

One skilled in the art will understand that although the invention has been described with respect to the standard "QWERTY" keyboard, that the invention as described herein is equally applicable to other, nonstandard, keyboard arrangements. In addition, although the invention has been described with respect to a keyboard having a single fold axis and two folding keyboard sections, the concepts of the invention are equally applicable to multiple fold axes and three or more folding keyboard sections.

The knowledgeable reader will also understand that the keyboard of this invention, while disclosed with particular reference to a portable personal computer, will have utility apart from the portable computer and may be used with other apparatus requiring input from a keyboard, such as word processors, note taking processors, etc.

While the preferred embodiments of the present invention have been shown in detail, it should be apparent that adaptations and modifications to those embodiments may occur to one skilled in the art without departing from the scope of the present invention as set forth in the following claims.

What is claimed is:

1. A keyboard comprising:

a first keyboard section bearing a subset of keys of the keyboard;

a second keyboard section bearing a subset of keys of the keyboard;

said keyboard sections mechanically coupled to allow pivotal movement about each other along a pivot axis between a closed position in which said keyboard sections are folded over to be substantially adjacent to and substantially parallel with each other, and an open position in which said keyboard sections are substantially coplanar with and substantially abut each other; and a slider mounted to said first keyboard section and bearing a subset of said keys of said keyboard section, said slider movable between a first position withdrawn into said keyboard section behind said pivot axis so as to facilitate folding of said keyboard into said closed position, and a second position, corresponding with said open position of said keyboard, extended beyond said pivot axis to nest with a corresponding notch in said second keyboard section, whereby said subset of keys of said slider are in a configuration for use when in said nested position.

2. The keyboard of claim 1, wherein:

a key of each said first and said second keyboard sections positioned at said abutting edges thereof is narrowed, from the standard width of other of said keys, along the edge thereof adjoining said abutting edges, whereby said abutting edges are straight edges when said slider is in said withdrawn position.

3. The keyboard of claim 2, wherein:

said keys are additionally shaped, having a concave central portion for generally matching the shape of human finger tips, and convex, tapered edges; and said narrowed keys are narrowed at one of said tapered edges only to a nearly vertical shape while preserving said concave central portion thereof.

4. The keyboard of claim 3, wherein:

said keyboard sections have a generally rectangular parallelpiped configuration with predetermined length, width and depth dimensions, said length being in the direction of rows of said keys, and said pivot axis is perpendicular to said rows; and said slider comprises at least a partial row of said keys.

5. The keyboard of claim 4, wherein:

said slider, when in said extended position nested in said corresponding notch of said second keyboard section, additionally serves as a lock to keep said keyboard in said open position.

6. The keyboard of claim 5, wherein:

said keyboard is a standard QWERTY keyboard;

said keyboard sections abut along the "Y"-"U" and "H"-"J" keys; and said slider row comprises the "N" row of keys.

7. The keyboard of claim 2, wherein:

said keyboard sections additionally include actuator sheets, said actuator sheets pressed together by operation of a key at an associated area of said actuator sheets for making an electrical connection between said actuator sheets indicating the operation of said key, which actuator sheets are held against movement with respect to said keyboard sections; and said slider is movable across said actuator sheets upon said movement thereof between said withdrawn and said extended positions.

8. The keyboard of claim 7, wherein:

said keys are additionally shaped, having a concave central portion for generally matching the shape of human finger tips, and convex, tapered edges; and said narrowed keys are narrowed at one of said tapered edges only to a nearly vertical shape while preserving said concave central portion thereof.

9. The keyboard of claim 8, wherein:

said keyboard sections have a generally rectangular parallelpiped configuration with predetermined length, width and depth dimensions, said length being in the direction of rows of said keys, and said pivot axis is perpendicular to said rows; and said slider comprises at least a partial row of said keys.

10. The keyboard of claim 9, wherein:

said slider, when in said extended position nested in said corresponding notch of said second keyboard section, additionally serves as a lock to keep said keyboard in said open position.

11. The keyboard of claim 10, wherein:

said keyboard is a standard QWERTY keyboard;

said keyboard sections abut in the open position along the "Y"-"U" and "H"-"J" keys; and said slider row comprises the "N" row of keys.

12. The keyboard of claim 1, wherein:

said keyboard sections additionally include actuator sheets, said actuator sheets pressed together by operation of a key at an associated area of said actuator sheets for making an electrical connection between said actuator sheets indicating the operation of said key, which actuator sheets are held against movement with respect to said keyboard sections; and said slider is movable across said actuator sheets upon said movement thereof between said withdrawn and said extended positions.

13. The keyboard of claim 12, wherein:

said keyboard sections have a generally rectangular parallelpiped configuration with predetermined length, width and depth dimensions, said length being in the direction of rows of said keys, and said axis is perpendicular to said rows; and said slider comprises at least a partial row of said keys.

14. The keyboard of claim 13, wherein:

said keyboard is a standard QWERTY keyboard;

said keyboard sections abut in the open position along the "Y"-"U" and "H"-"J" keys; and said slider row comprises the "N" row of keys.

15. A keyboard comprising:

at least two keyboard sections, each bearing a subset of keys of the keyboard;

adjacent ones of said keyboard sections mechanically coupled to allow pivotal movement about each other along a pivot axis between a closed position in which said keyboard sections are folded over to be substantially adjacent to and substantially parallel with each other, and an open position in which said keyboard sections are substantially coplanar with and substantially abut each other; and at least one slider, each mounted to one of said keyboard sections and bearing a subset of said keys of said keyboard section, said slider movable between a first position withdrawn into said keyboard section behind said pivot axis so as to facilitate folding of said keyboard into said closed position, and a second position, corresponding with said open position of said keyboard, extended beyond said pivot axis to nest with a corresponding notch in said adjacent keyboard section, whereby said subset of keys of said slider are in a configuration for use when in said nested position.

16. The keyboard of claim 15, wherein:

said keyboard sections additionally include actuator sheets, said actuator sheets pressed together by operation of a key at an associated area of said actuator sheets for making an electrical connection between said actuator sheets indicating the operation of said key, which and actuator sheets are held against movement with respect to said keyboard sections; and said slider is movable across said actuator sheets upon said movement thereof between said withdrawn and said extended positions.

17. An input keyboard for use with a portable computer comprising:

a first keyboard section bearing a subset of keys of the keyboard;

a second keyboard section bearing a subset of keys of the keyboard;

said keyboard sections having actuator elements associated with each key and actuator sheets, said actuator elements transmitting operation of an associated key to the associated area of said actuator sheets for making an electrical connection between said actuator sheets providing said input to said computer indicating the operation of said key, which actuator sheets are held against movement with respect to said keyboard sections;

said keyboard sections mechanically coupled to allow pivotal movement about each other along a pivot axis between a closed position in which said keyboard sections are folded over to be substantially adjacent to and substantially parallel with each other, and an open position in which said keyboard sections are substantially coplanar with and substantially abut each other; and a slider mounted to said first keyboard section and bearing a subset of said keys of said keyboard section, said slider movable between a first position withdrawn into said keyboard section behind said pivot axis so as to facilitate folding of said keyboard into said closed position, and a second position, corresponding with said open position of said keyboard, extended beyond said pivot axis to nest with a corresponding notch in said second keyboard section, whereby said subset of keys of said slider are in a configuration for use when in said nested position, said slider keys movable across said stationary actuator sheets upon said movement of said slider between said withdrawn and said extended positions.

18. The input keyboard of claim 17, wherein:

said keyboard sections have a generally rectangular parallelpiped configuration with predetermined length, width and depth dimensions, said length being in the direction of rows of said keys, and said pivot axis is perpendicular to said rows; and said slider comprises at least a partial row of said keys; whereby said input keyboard, when folded, is of a length no greater than that of said computer.

19. The input keyboard of claim 18, wherein:

a key of each said first and said second keyboard sections positioned at said abutting edges thereof is narrowed, from the standard width of other of said keys, along the edge thereof adjoining said abutting edges, whereby said abutting edges are straight edges when said slider is in said withdrawn position.

20. The input keyboard of claim 19, wherein:

said keys are additionally shaped, having a concave central portion for generally matching the shape of human finger tips, and convex, tapered edges; and said narrowed keys are narrowed at one of said tapered edges only to a nearly vertical shape while preserving said concave central portion thereof.

21. The input keyboard of claim 20, wherein:

said slider, when in said extended position nested in said corresponding notch of said second keyboard section, additionally serves as a lock to keep said input keyboard in said open position.

* * * * *